United States Patent
Chen et al.

(10) Patent No.: US 9,819,580 B2
(45) Date of Patent: Nov. 14, 2017

(54) OPEN SHORTEST PATH FIRST FOR TEMPORAL TUNNEL SERVICES

(71) Applicant: Futurewei Technologies, Inc., Plano, TX (US)

(72) Inventors: Huaimo Chen, Bolton, MA (US); Renwei Li, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 82 days.

(21) Appl. No.: 15/095,748

(22) Filed: Apr. 11, 2016

(65) Prior Publication Data

US 2016/0315855 A1    Oct. 27, 2016

Related U.S. Application Data

(60) Provisional application No. 62/152,517, filed on Apr. 24, 2015.

(51) Int. Cl.
*H04L 12/723* (2013.01)
*H04L 12/721* (2013.01)
(Continued)

(52) U.S. Cl.
CPC .............. *H04L 45/50* (2013.01); *H04L 45/12* (2013.01); *H04L 45/125* (2013.01);
(Continued)

(58) Field of Classification Search
CPC ....... H04L 45/50; H04L 45/12; H04L 47/829; H04L 47/826; H04L 45/507; H04L 45/125; H04L 45/54; H04L 47/825
See application file for complete search history.

(56) References Cited

U.S. PATENT DOCUMENTS 8,107,379 B2 * 1/2012 Vasseur ............... H04L 45/04
370/238
8,717,899 B2 * 5/2014 Boutros .............. H04L 41/06
370/236
(Continued)

OTHER PUBLICATIONS

Chen, H., et al., "Extensions to OSPF for Temporal LSP draft-chen-ospt-tts-00.txt," Internet Engineering Task Force, Standards Track, Jul. 2, 2015, 11 pgs.
(Continued)

*Primary Examiner* — Brian O'Connor
(74) *Attorney, Agent, or Firm* — Conley Rose, P.C.

(57) ABSTRACT

A network element (NE) in a network, comprising a memory configured to store time-based traffic engineering (TE) information associated with network resource reservations on a link attached to the NE in a series of time intervals each having a predetermined start time and a predetermined end time, and a processor coupled to the memory and configured to reserve, at a first current time, a network resource for a temporal tunnel service (TTS) on the link to carry traffic during a scheduled time interval subsequent to the first current time, wherein the scheduled time interval comprises a scheduled start time and a scheduled end time, and update, at the first current time, the time-based TE information in the scheduled time interval according to the network resource reserved to produce a first updated TE information in the scheduled time interval.

20 Claims, 13 Drawing Sheets

(51) Int. Cl.
    *H04L 12/911*    (2013.01)
    *H04L 12/741*    (2013.01)
    *H04L 12/729*    (2013.01)

(52) U.S. Cl.
    CPC ............ *H04L 45/507* (2013.01); *H04L 45/54* (2013.01); *H04L 47/825* (2013.01); *H04L 47/826* (2013.01); *H04L 47/829* (2013.01)

(56) References Cited

U.S. PATENT DOCUMENTS

| | | | |
|---|---|---|---|
| 9,258,210 B2 * | 2/2016 | Torvi | H04L 45/04 |
| 2007/0160061 A1 * | 7/2007 | Vasseur | H04L 45/02 |
| | | | 370/395.4 |
| 2007/0165515 A1 * | 7/2007 | Vasseur | H04L 12/66 |
| | | | 370/216 |

OTHER PUBLICATIONS

Bradner, S., "Key words for use in RFCs to Indicate Requirement Levels," Network Working Group, RFC 2119, Mar. 1997, 3 pgs.
Moy, J., "OSPF Version 2," Network Working Group, RFC 2328, Apr. 1998, 201 pgs.
Coltun, R., "The OSPF Opaque LSA Option," Network Working Group, RFC 2370, Jul. 1998, 15 pgs.
Awduche, D., et al., "RSVP-TE: Extensions to RSVP for LSP Tunnels," Network Working Group, RFC 3209, Dec. 2001, 61 pgs.
Katz, D., et al., "Traffic Engineering (TE) Extensions to OSPF Version 2," Network Working Group, RFC 3630, Sep. 2003, 14 pgs.

\* cited by examiner

OPEN SHORTEST PATH FIRST FOR TEMPORAL TUNNEL SERVICES

CROSS-REFERENCE TO RELATED APPLICATIONS

The present application claims priority to U.S. Provisional Patent Application 62/152,517, filed Apr. 24, 2015 by Huaimo Chen and Renwei Li, and entitled "Open Shortest Path First for Temporal Tunnel Services," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Open shortest path first (OSPF) protocol is an interior gateway protocol (IGP) for routing Internet protocol (IP) packets within a single routing domain such as an autonomous system (AS). The OSPF protocol gathers link state information from available routers and constructs a topology map of the network. OSPF traffic engineering (TE) is an extension to OSPF for supporting TE. TE is a method of optimizing performance of networks. TE includes measuring, modeling, characterizing, and controlling network traffic to achieve particular performance objectives. The OSPF TE protocol is described in Internet engineering task force (IETF) document request for comments (RFC) 3630.

SUMMARY

In one embodiment, the disclosure includes a network element (NE) in a network, comprising a memory configured to store time-based TE information associated with network resource reservations on a link attached to the NE in a series of time intervals each having a predetermined start time and a predetermined end time, a processor coupled to the memory and configured to reserve, at a first current time, a network resource for a temporal tunnel service (TTS) on the link to carry traffic during a scheduled time interval subsequent to the first current time, wherein the scheduled time interval comprises a scheduled start time and a scheduled end time, and update, at the first current time, the time-based TE information in the scheduled time interval according to the network resource reserved to produce a first updated TE information in the scheduled time interval, and a transmitter coupled to the processor and configured to send a first update message to other NEs in the network prior to the scheduled start time to provide the first updated TE information in the scheduled time interval in advance of the scheduled start time. In some embodiments, the disclosure also includes wherein the processor is further configured to determine that the link comprises a first amount of unreserved network resource in the scheduled time interval according to the time-based TE information stored in the memory, and update the time-based TE information by subtracting a second amount of the reserved network resource from the first amount of unreserved network resource, and/or determine that after subtracting the second amount of the reserved network resource, a change in the first amount of unreserved network resource exceeds a predetermined threshold, and wherein the first update message is sent when determining that the change exceeds the predetermined threshold, and/or wherein the network resource reservation is associated with bandwidth reservation at one or more priority levels, and wherein the first amount of unreserved network resource and the second amount of the reserved network resource are of bandwidths at a same priority level, and/or wherein the processor is further configured to determine that the TTS is deleted at a second current time prior to the scheduled end time, determine, at the second current time, that the link comprises a third amount of unreserved network resource in a remaining time of the scheduled time interval according to the time-based TE information stored in the memory, and update the time-based TE information by adding the second amount of the reserved network resource to the third amount of unreserved network resource for the remaining time of the scheduled time interval to produce a second updated TE information in the remaining time of the scheduled time interval, and/or determine that after adding the second amount of the reserved network resource, a change in the third amount of unreserved network resource exceeds a predetermined threshold, and wherein the transmitter is further configured to send a second update message to other NEs in the network to provide the second updated TE information in the remaining time of the scheduled time interval, and/or wherein the series of time intervals are consecutive in time, wherein the time-based TE information indicates an amount of unreserved network resource for each of the series of time intervals, and an absolute time for each predetermined start time of each of the series of time intervals, and wherein the absolute time is a global clock time that is synchronized among all NEs in the network, and/or wherein the series of time intervals are consecutive in time, and wherein the time-based TE information indicates an amount of unreserved network resource for each of the series of time intervals, and a duration for each of the series of time intervals, and/or wherein the network is a multiprotocol label switching (MPLS) network, where the TTS is carried by a label switched path (LSP) tunnel in the network, wherein the NE is positioned along a forwarding path of the LSP, and wherein the first update message is an OSPF TE link state advertisement (LSA).

In another embodiment, the disclosure includes a method implemented by a NE in a network, the method comprising storing, in a memory of the NE, time-based TE information associated with network resource reservations on a link attached to the NE in a first series of time intervals each having a predetermined start time and a predetermined end time, reserving, via a processor of the NE, at a first current time, a network resource for a TTS on the link to carry traffic during a scheduled time interval subsequent to the first current time, wherein the scheduled time interval comprises a scheduled start time and a scheduled end time, updating, via the processor, the time-based TE information in the scheduled time interval according to the reserved network resource to produce a first updated TE information in the schedule time interval, and sending, via a transmitter of the NE, a first update message to other NEs in the network prior to the scheduled start time to provide the first updated TE information in the scheduled time interval in advance of the scheduled start time. In some embodiments, the disclosure also includes determining, via the processor, that the link comprises a first amount of unreserved network resource in the scheduled time interval according to the time-based TE information stored in the memory, and wherein updating the time-based TE information in the scheduled time interval comprises subtracting a second amount of the reserved network resource from the first amount of unreserved network resource, and/or determining, via the processor, that after subtracting the second amount of the reserved network resource, a change in the first amount of unreserved network resource exceeds a predetermined threshold, wherein the first update message is sent when determining that the change exceeds the predetermined threshold, and/or determining, via the processor, that the TTS is deleted at a second current time prior to the scheduled end time, determining, at the second current time, that the link comprises a third amount of unreserved network resource in remaining time of the scheduled time interval according to the time-based TE information stored in the memory, and updating the time-based TE information by adding the second amount of the reserved network resource to the third amount of unreserved network resource for the remaining time of the scheduled time interval, and/or receiving, via a receiver of the NE at a third current time, a second update message from another NE indicating an amount of unreserved resource on a second link for each of a second series of time intervals subsequent to the third current time, and updating, via the processor, the time-based TE information according to the amount of unreserved resource on the second link each of the second series of time intervals indicated in the second update message, and/or wherein the second update message indicates timing information of the second series of time intervals by absolute time, relative time, or combinations thereof.

In yet another embodiment, the disclosure includes a method comprising storing, by a network node of the network, TE information of unreserved bandwidth for a series of time intervals on a link attached to the network node, updating, by the network node, the TE information at a current time when a first bandwidth is reserved for a MPLS TE LSP to carry traffic during a LSP time interval after the current time by subtracting the first bandwidth from the unreserved bandwidth on the link for the LSP time interval, wherein the LSP time interval is from a first time to a second time, and distributing, by the network node to other nodes in the network, the updated TE information on the link for the series of time intervals. In some embodiments, the disclosure also includes wherein distributing the updated TE information comprises distributing an OSPF TE LSA comprising a type-length-value (TLV) comprising a first type field indicating that the TLV is a TTS link TLV, and a sub-TLV indicating the updated TE information for the series of time intervals, and/or wherein the sub-TLV comprises a second type field indicating that the sub-TLV is an absolute TTS unreserved bandwidth sub-TLV, one or more unreserved bandwidth fields each indicating an amount of unreserved bandwidth at a certain priority level on the link in a first time interval, denoted as j, of the series of time intervals from a first absolute time, denoted as $T_j$, to a second absolute time, denoted as $T_k$, and an absolute time field indicating the first absolute time, wherein the first absolute time is synchronized among all network nodes in the network, and wherein j=k+1, and/or wherein the sub-TLV comprises a third type field indicating that the sub-TLV is a relative TTS unreserved bandwidth sub-TLV, one or more unreserved bandwidth fields each indicating an amount of unreserved bandwidth at a certain priority level on the link in a first time interval of the series of time intervals, and a relative time field indicating a period of the first time interval, and/or wherein distributing the updated TE information comprises distributing an OSPF TE LSA comprising a TLV comprising a first type field indicating that the TLV is a TTS link TLV, a sub-TLV indicating a segment of the updated TE information for the series of time intervals, and a segment-number field indicating a segment number that identifies the segment of the TE information.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

OSPF TE provides mechanisms for describing TE topology such as bandwidth and distributing TE information within a given OSPF area or domain. For example, OSPF TE is employed in a MPLS network to describe the topology over which LSPs may be established. After having the IF topology, MPLS computes paths and employs a signaling protocol such as a resource reservation protocol (RSVP) as described in IETF document RFC 3209, which is incorporated for reference, to establish LSPs along the computed paths for forwarding data traffic. In addition, OSPF TE may be employed with the RSVP to record and flood TE link information such as link bandwidth updated by RSVP signaled bandwidth reservations for the LSPs.

Figure 1:
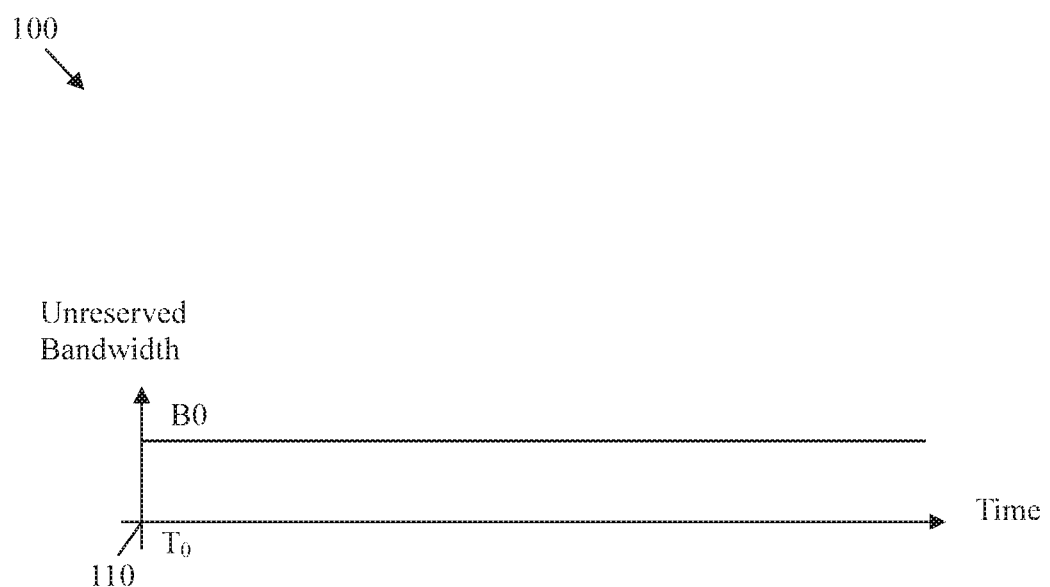
FIG. 1 is a timing diagram of an embodiment of a time agnostic link bandwidth profile.

FIG. 1 is a timing diagram of an embodiment of a time agnostic link bandwidth profile 100. The x-axis represents time in some arbitrary constant units. The y-axis represents unreserved link bandwidth. The IETF document RFC 3630, which is incorporated by reference, describes an OSPF TE system that tracks unreserved bandwidth at eight priority levels and distributes unreserved bandwidth for each priority level at a single point of time 110, denoted as T0, which is a current time. The profile 100 shows the amount of unreserved bandwidth, denoted as B0, from the current time T0 to an indefinite end time or until there is a change to the unreserved bandwidth such as the occurrence of a next bandwidth reservation. The profile 100 does not track unreserved bandwidth by time intervals or on a time-period basis. Thus, the profile 100 is not suitable for tunnel service scheduling, which requires bandwidth reservation in advance of time intervals scheduled for a LSP to carry traffic.

Disclosed herein are various embodiments of an OSPF TE system that is configured to provide TTSs such as tunnel service scheduling and tunnel service calendaring by maintaining and distributing time-based TE information. Time-based TE information refers to information associated with network resource availability or reservation in a time interval-by time interval basis instead of a single point of time or an indefinite time interval. An example of time-based TE information may include amounts of unreserved bandwidths at a particular priority level in a series of time intervals each having a predetermined start time and a predetermined end time. The disclosed embodiments allow TE LSP tunnels to use network resources for some period of time and allow the TE LSPs to be set up in advance of the period of time. The employment of TTSs increases efficiency in network resource usage. In an embodiment, each network node in a network maintains time-based TE information of links in the network. When a TE LSP is set up to use a network resource to carry traffic in one or more scheduled time intervals, the network resource is reserved in advance of the scheduled time intervals. For example, each network node attached to a link along a forwarding path of the TE LSP updates time-based TE information in each scheduled time interval by subtracting an amount of the reserved network resource from an amount of unreserved network resource on the link in each scheduled time interval. When the TE LSP is deleted from the network, the network resource reserved on the link for remaining scheduled time intervals is released. For example, each network node attached to a link along the forwarding path of the TE LSP updates the time-based TE information in the remaining scheduled time intervals by adding the amount of reserved network resource to the amount of unreserved network resource on the link in the remaining scheduled time intervals. In order to facilitate other network nodes in the network to maintain time-based TE information and reserve network resources for TTSs in advance of scheduled intervals, each node also distributes time-based TE information to the other network nodes. The disclosed embodiments extend the OSPF TE described in the document RFC 3630 to facilitate TTSs. Although the disclosed embodiments describe time-based TE information in the context of bandwidths, the disclosed embodiments are suitable for maintaining and distributing any type of network resource as a function of time.

Figure 2:
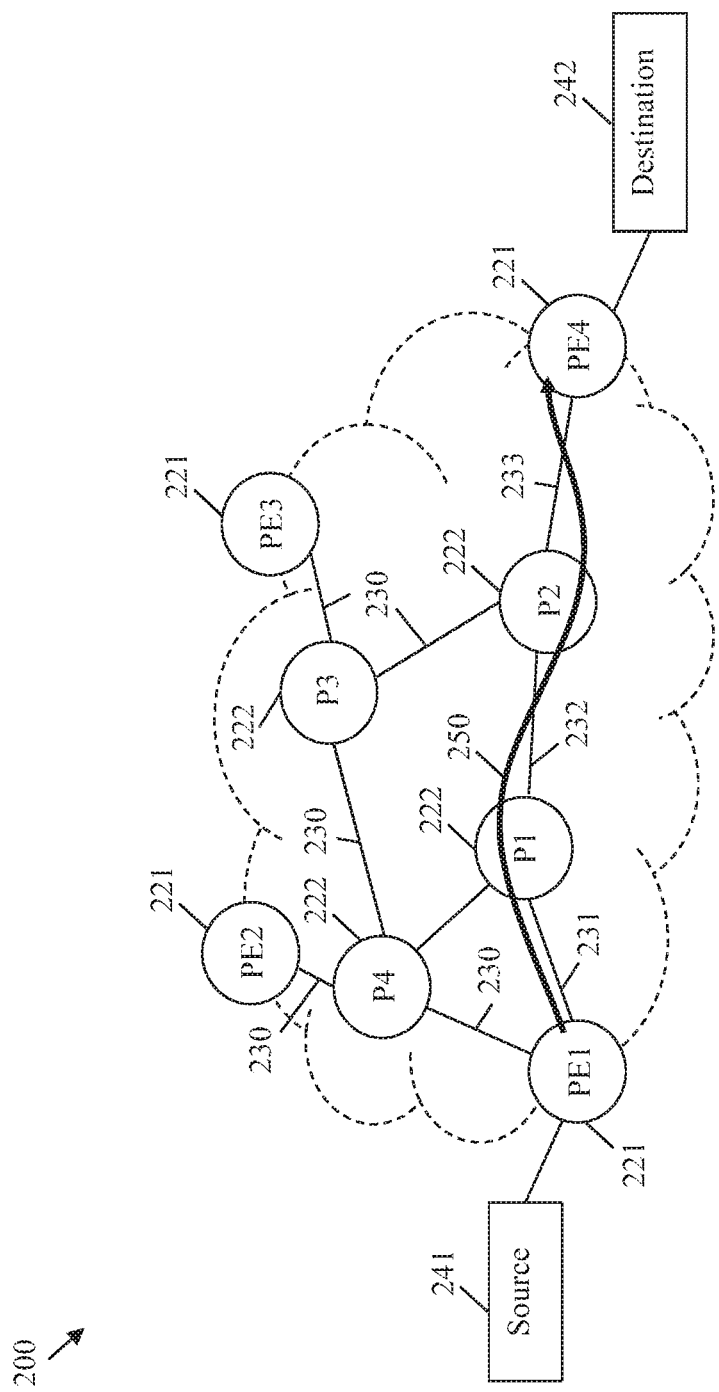
FIG. 2 is a schematic diagram of an embodiment of a network that provides TTSs.

FIG. 2 is a schematic diagram of an embodiment of a network 200 that provides TTSs. The network 200 comprises a plurality of edge nodes 221 and a plurality of internal nodes 222 interconnected by a plurality of communication links 230, 231, 232, and 233. The edge nodes 221 are shown as PE1, PE2, PE3, and PE4. The edge nodes 221 are located at an edge or a boundary of the network 200 and may be coupled to one or more nodes that are located outside the network 200. The internal nodes 222 are shown as P1, P2, P3, and P4. The internal nodes 222 are located within the network 200. The underlying physical network of the network 200 may be any type of transport network such as an electrical network and/or an optical network. The communication links 230-233 may comprise physical links such as fiber optic links, electrical links, wireless links and/or logical links used to transport data in the network 200. The network 200 operates under a single network administrative domain such as an OSPF area. In an embodiment, the network 200 employs a MPLS forwarding data plane.

The edge nodes 221 and the internal nodes 222 are network devices configured to perform TTS operations in the network 200. Some examples of TTS operations include computing paths for temporal LSPs that are scheduled to carry traffic in scheduled time intervals, reserving network resource on the links 230-233 that are along the computed paths for the temporal LSPs in advance of the scheduled time intervals, setting up and tearing down temporal LSPs, and maintaining and distributing time-based TE information, as described more fully below. A LSP is a predetermined route between a source-destination pair and identified by path labels. A temporal LSP is a scheduled LSP, where network resources are reserved in advance on links 230-233 along a path of the temporal LSP according to scheduled time intervals instead of an indefinite time interval.

As an example, the network 200 is configured with a temporal LSP 250 that is scheduled to transport data traffic for a data flow between a source 241 and a destination 242 according to a given time schedule. The source 241 is any network device configured to generate data for the data flow. The destination 242 is any network device configured to consume the data of the data flow. The temporal LSP 250 extends from the edge node PE1 221 to the edge node PE4 221, traversing through the internal nodes P1 and P2 222. The edge node PE1 221 that receives data traffic from the source 241 external to the network 200 and sends data traffic using the temporal LSP 250 in the network 200 is referred to as an ingress node of the temporal LSP 250. The edge node PE4 221 that receives data traffic from the temporal LSP 250 in the network 200 and sends data traffic to the destination 242 outside of the network 200 is referred to as an egress node of the temporal LSP 250. The internal nodes P1 and P2 222 located along a path of the temporal LSP 250 between the ingress node and the egress node are referred to as transit nodes of the temporal LSP 250. The direction from the source 241 to the destination 242 is referred to as downstream. The direction from the destination 242 to the source 241 is referred to as upstream.

In an embodiment, a network administrator or a user configures the edge node PE1 221, which is the ingress node of the temporal LSP 250, with a time schedule and a network constraint for the LSP 250. The time schedule comprises a series of time intervals each having a predetermined start time and a predetermined end time. Upon receiving the configuration, the edge node PE1 221 computes a shortest path in the network for the temporal LSP 250 satisfying the network constraint in each time interval. The edge node 221 initiates the creation of the temporal LSP 250 in a downstream direction. To create the temporal LSP 250, each node on the path, including the edge node 221 and the internal nodes P1 and P2 222, reserves a network resource in advance on a next hop link for the temporal LSP 250 in each time interval based on the network constraint. For example, the edge node PE1 221, the internal node P1 222, and the internal node P2 222 reserve network resources on the link 231, 232, and 233 in each time interval based on the network constraint, respectively. After reserving the network resources, each of the edge node PE1 221 and the internal nodes P1 and P2 222 tracks and updates remaining available or unreserved network resource on corresponding links 231-233 in each time interval, for example, in a time-based traffic engineering link state database (TEDB), and distributes the updated unreserved network resource information to other edge nodes 221 and other internal nodes 222. In an embodiment, OSPF TE LSAs are extended to enable distribution of time-based TE information in the network 200. It should be noted that in some embodiments, updated unreserved network resource information is distributed when there is a significant change in the amount of unreserved network resource, for example, based on a predetermined threshold.

To facilitate subsequent data forwarding, the edge node PE4 221, the internal node P2 222, and the internal node P1 222 allocates a first label, a second label, and a third label, respectively, and notifies a next upstream node of a corresponding label. Subsequently, upon receiving a packet from the source 241, the edge node PE1 221 attaches the third label to the packet and forwards the packets to a next downstream node, which is the internal node P1 222, along the link 231. When the internal node P1 222 receives the packet, the internal node P1 222 swaps the third label with the second label and forwards the packet to a next downstream node, which is the internal node P2 222, along the link 232. When the internal node P2 222 receives the packet, the internal node P2 222 swaps the second label with the first label and forwards the packet to a next downstream node, which is the edge node PE4 221, along the link 233. When the edge node PE4 221 receives the packet, the edge node PE4 221 removes the first label and forwards the packet to the destination 242.

To tear down the temporal LSP 250, the network administrator or the user sends the edge node PE1 221 a tear-down request. The edge node PE1 221 initiates the tear down of the temporal LSP 250 in a downstream direction. Each node on the path, including the edge node PE1 221 and the internal nodes P1 and P2 222, releases the in advance reserved network resource in remaining time intervals that have not elapsed. It should be noted that although the reservation and distribution of time-based network resource are described in the context of MPLS tunnels, the network 200 may be alternatively configured as determined by a person of ordinary skill in the art to achieve similar functionalities.

Figure 3:
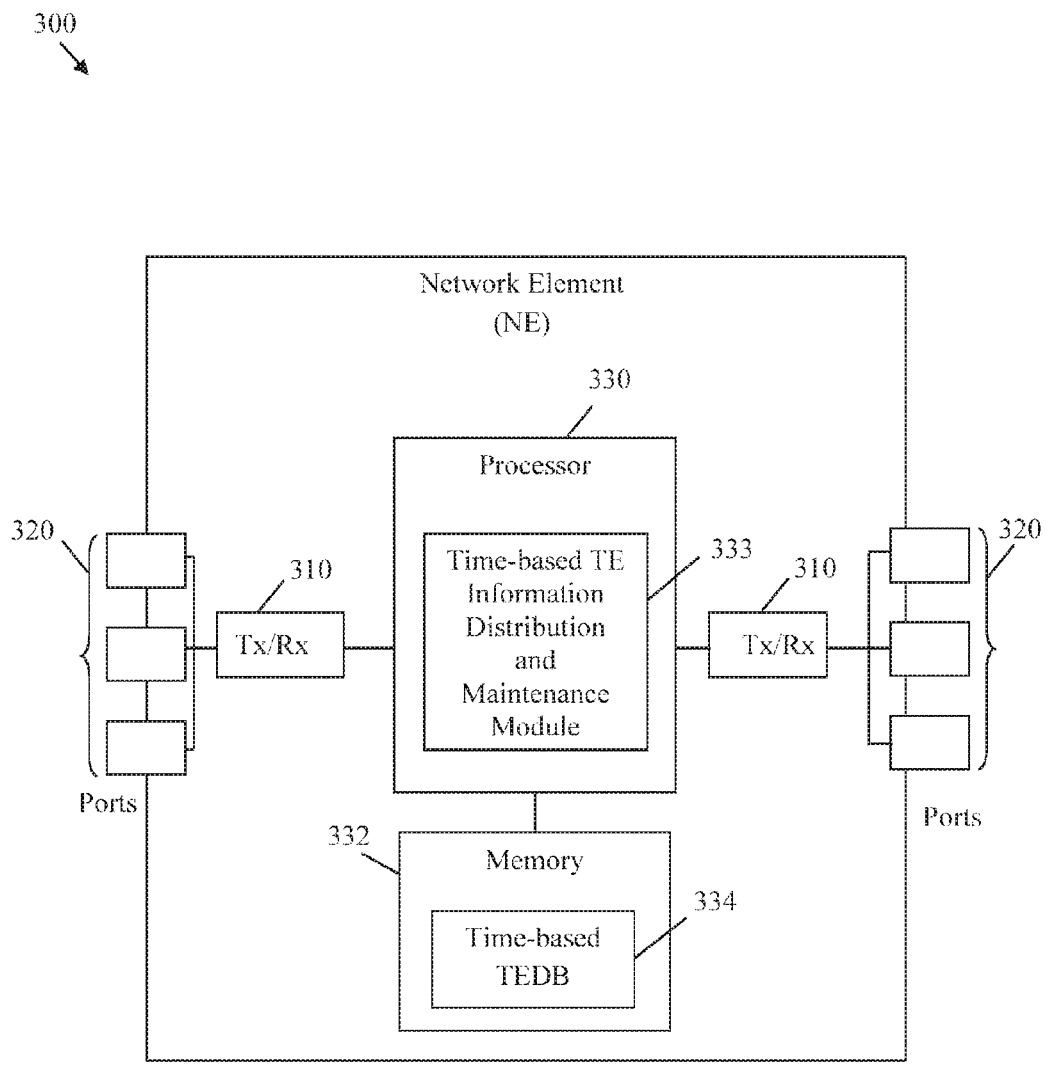
FIG. 3 is a schematic diagram of an embodiment of a NE.

FIG. 3 is a schematic diagram of an embodiment of a NE 300, such as edge nodes 221, the internal nodes 222, the source 241, and the destination 242 in a network such as the network 200. NE 300 may be configured to implement and/or support temporal tunnel creation and deletion mechanisms and schemes described herein. NE 300 may be implemented in a single node or the functionality of NE 300 may be implemented in a plurality of nodes. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments.

At least some of the features/methods described in the disclosure are implemented in a network apparatus or component such as a NE 300. For instance, the features/methods in the disclosure may be implemented using hardware, firmware, and/or software installed to run on hardware. The NE 300 is any device that transports packets through a network, e.g., a switch, router, bridge, server, a client, etc. As shown in FIG. 3, the NE 300 comprises transceivers (Tx/Rx) 310, which may be transmitters, receivers, or combinations thereof. The Tx/Rx 310 is coupled to a plurality of ports 320 for transmitting and/or receiving frames from other nodes.

A processor 330 is coupled to each Tx/Rx 310 to process the frames and/or determine which nodes to send the frames to. The processor 330 may comprise one or more multi-core processors and/or memory devices 332, which may function as data stores, buffers, etc. The processor 330 may be implemented as a general processor or may be part of one or more application specific integrated circuits (ASICs) and/or digital signal processors (DSPs).

The processor 330 comprises a time-based TE information distribution and maintenance module 333 which may perform distribution and maintenance of time-based TE information and may implement methods 600, 700, 800, and 900, as discussed more fully below, and/or any other flowcharts, schemes, and methods discussed herein. As such, the inclusion of the time-based TE information distribution and maintenance module 333 and associated methods and systems provide improvements to the functionality of the NE 300. Further, the time-based TE information distribution and maintenance module 333 effects a transformation of a particular article (e.g., the network) to a different state. In an alternative embodiment, the time-based TE information distribution and maintenance module 333 may be implemented as instructions stored in the memory device 332, which may be executed by the processor 330.

The memory device 332 may comprise a cache for temporarily storing content, e.g., a random-access memory (RAM). Additionally, the memory device 332 may comprise a long-term storage for storing content relatively longer, for example, a read-only memory (ROM). For instance, the cache and the long-term storage may include dynamic RAMs (DRAMs), solid-state drives (SSDs), hard disks, or combinations thereof. The memory device 332 may be configured to store one or more time-based TEDBs 334, as discussed more fully below.

It is understood that by programming and/or loading executable instructions onto the NE 300, at least one of the processor 330 and/or memory device 332 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 4:
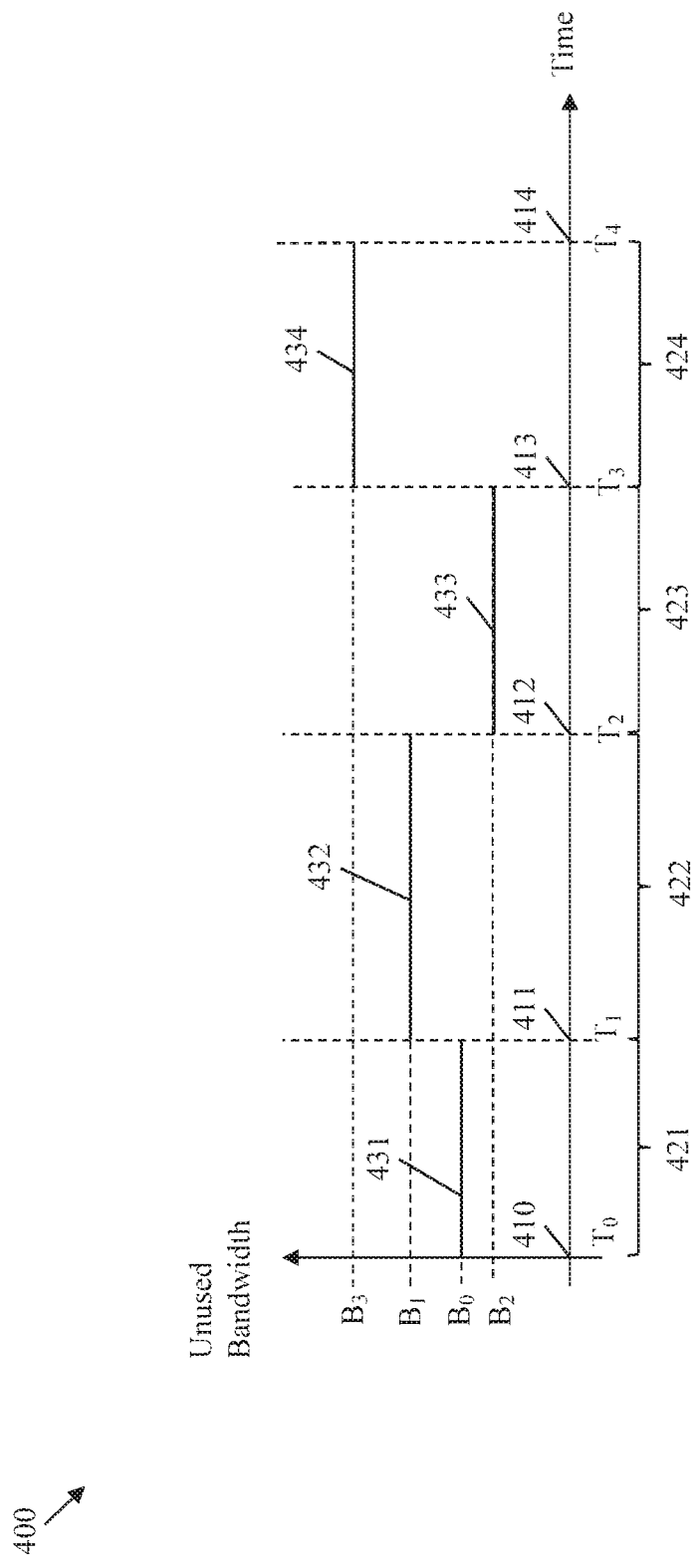
FIG. 4 is a timing diagram of an embodiment of a time-based link bandwidth profile.

FIG. 4 is a timing diagram of an embodiment of a time-based link bandwidth profile 400. The x-axis represents time in some arbitrary constant units. The y-axis represents unreserved bandwidth. The profile 400 corresponds to time-based TE information maintained by the edge nodes 221, the internal nodes 222, and the NE 300, for example, in a time-based TEDB such as the time-based TEDB 334. The profile 400 shows unreserved bandwidth at a certain priority level on a link such as the links 230-233 in a network such as the network 200 as a function of time, which includes a series of time intervals 421, 422, 423, and 424. As shown, the amount of unreserved bandwidth 431 at the time interval 421 from a time 410, denoted as T0, to a time 411, denoted as T1, is B0. The amount of unreserved bandwidth 432 at the time interval 422 from the time 411 to a time 412, denoted as T2, is B1. The amount of unreserved bandwidth 433 at the time interval 423 from the time 412 to a time 413, denoted as T3, is B2. The amount of unreserved bandwidth 434 at the time interval 424 from the time 413 to a time 414, denoted as T4, is B3.

In one embodiment, the pro 400 is recorded in a time-based TEDB using absolute time as shown below:

$[T_0, B_0], [T_1, B_1], [T_2, B_2], [T_3, B_3]$, where $T_0$, $T_1$, $T_2$, and $T_3$ are global clock times in the network synchronized among all nodes in the network.

In another embodiment, the profile 400 is recorded in a time-based TEDB using relative time as shown below:

$[P_0, B_0], [P_1, B_1], [P_2, B_2], [P_3, B_3]$, where $P_0$, $P_1$, $P_2$, and $P_3$ represent durations of the time intervals 421, 422, 423, and 424, respectively, and $P_0$ begins at a current time $T_0$. When using relative time representations, a node may use a local clock time, which may be different from another node in the network. One approach to implementing the profile 400 is to configure a timer to expire at a unit time (e.g., at every second) and use a period variable, denoted as P, to track the expiration of the time intervals 421-424. For example, at time 410, P is set to a duration or a period (e.g., $P_0$) of the time interval 421 according to the unit time. When the timer expires, P is decremented by the unit time and the duration or period (e.g., $P_0$) of a corresponding time interval in the time-based TEDB is updated by P. The expiration of the timer indicates the unit time has elapsed. When P reaches a value of 0, P is set to a duration or a period (e.g., $P_1$) of a next time interval, which is the time interval 422.

Figure 5A:
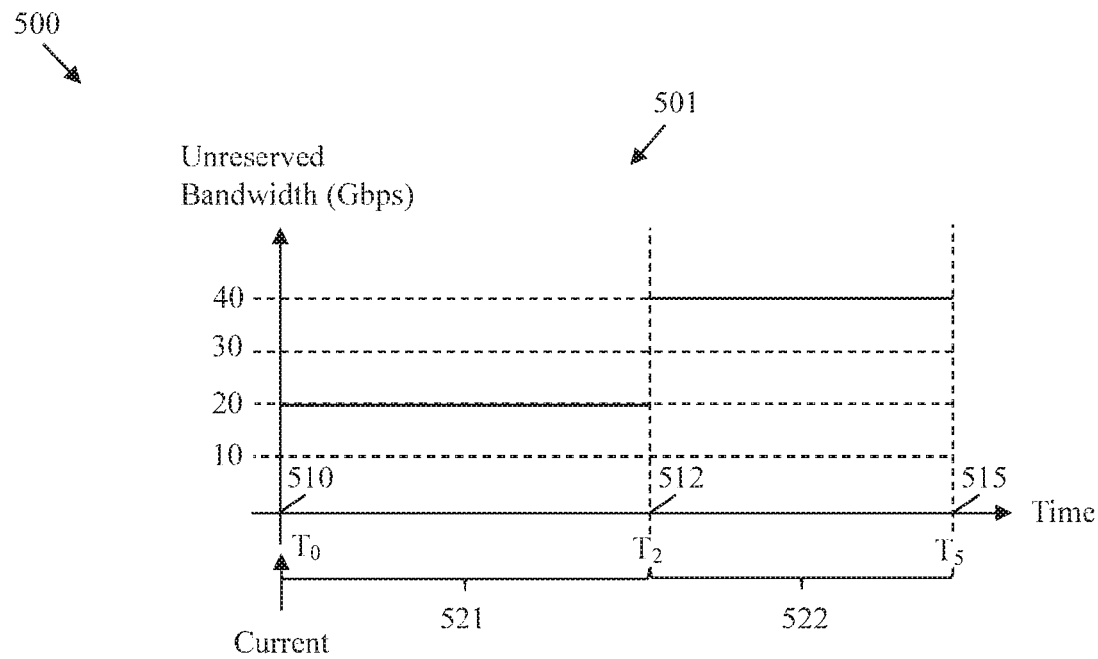
FIG. 5A illustrates an embodiment of a link bandwidth profile at a current time.
Figure 5B:
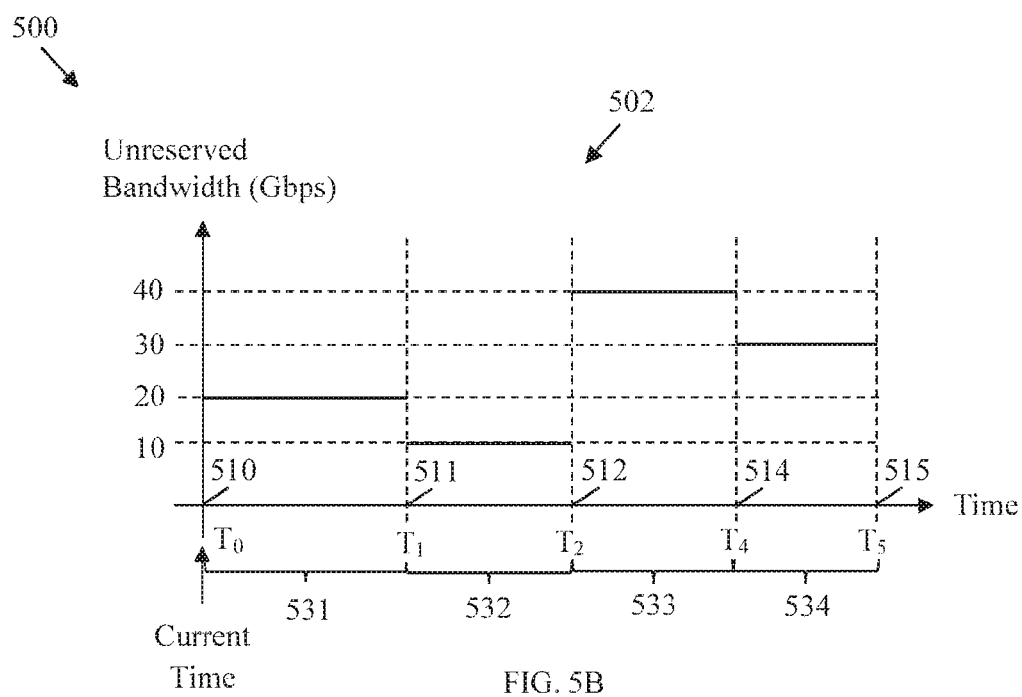
FIG. 5B illustrates an embodiment of a link bandwidth profile after setting up a temporal LSP at a current time.
Figure 5C:
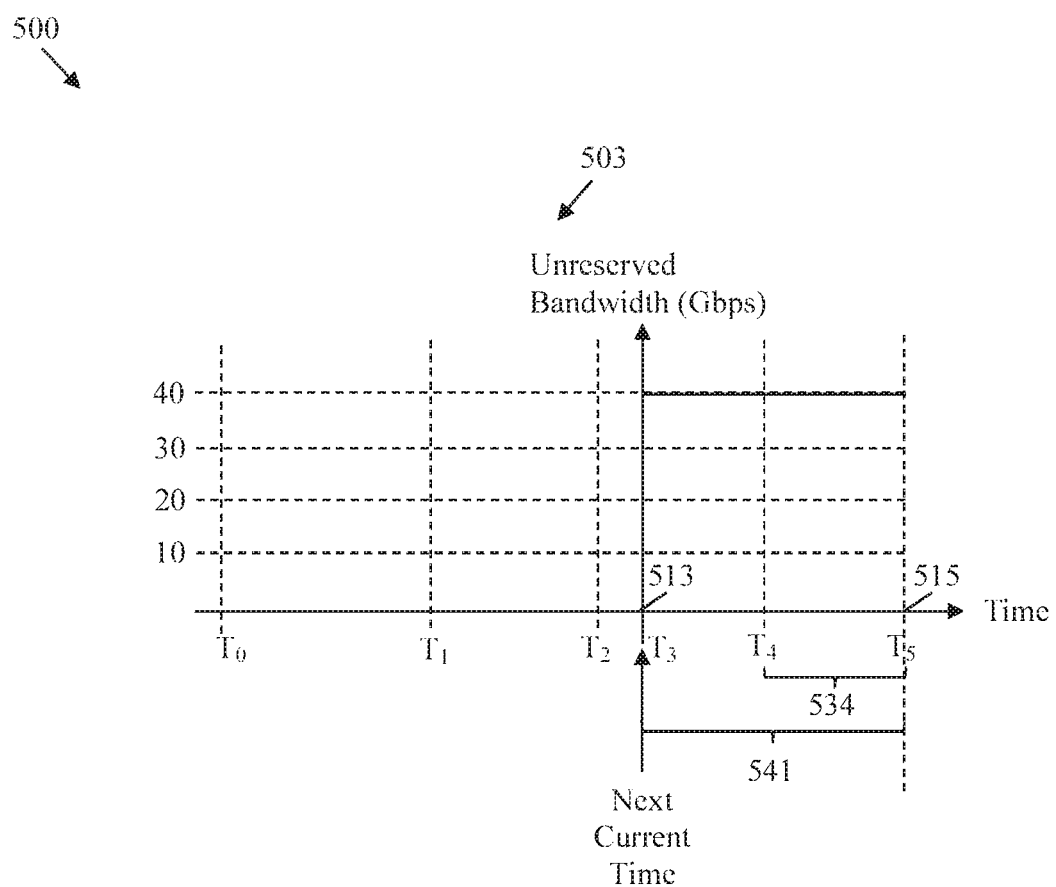
FIG. 5C illustrates an embodiment of a link bandwidth profile after deleting a temporal LSP at a next current time.

In some other embodiments, the profile 400 is recorded in a time-based TEDB using a combination of absolute time and relative time as shown below:

$T_0, [P_0, B_0], [P_1, B_1], [P_2, B_2], [P_3, B_3]$, where $P_0$, $P_1$, $P_2$, and $P_3$ represent durations of the time intervals 421, 422, 423, and 424, respectively, and $T_0$ represents a start time of the series of time intervals 421-424. The time $T_0$ is an absolute time, which is a global clock time of the network synchronized among all nodes in the network FIGS. 5A-C illustrates an embodiment of a time-based TE information tracking scenario 500. FIG. 5A illustrates an embodiment of a link bandwidth profile 501 similar to the profile 400 at a current time 510, denoted as $T_0$. The profile 501 shows unreserved bandwidths on a link such as the links 230-233 in a series of time intervals 521 and 522 similar to the time intervals 421-424. The profile 501 is tracked by a node such as the edge nodes 221 and the internal nodes 222 connected to the link in a network such as the network 200. As shown, the link comprises about 20 gigabits per second (Gbps) of unreserved bandwidth at the time interval 521 and about 40 Gbps of unreserved bandwidth at the time interval 522. The interval 521 begins at the current time 510 and ends at a time 512, denoted as $T_2$. The interval 522 begins at the time 512 and ends at a time 515, denoted as $T_5$.

FIG. 5B illustrates an embodiment of a link bandwidth profile 502 after setting up a temporal LSP such as the temporal LSP 250 at the current time 510. For example, the temporal LSP is scheduled to carry traffic in a series of time intervals 532 and 534 with a bandwidth of about 10 Gbps. The time interval 532 begins at a time 511, denoted as $T_1$, and ends at the time 512. The time interval 534 begins at a time 514, denoted as $T_4$, and ends at the time 515. To track unreserved bandwidth on the link, the profile 501 is updated to the profile 502, where 10 Gbps of bandwidths are subtracted from the unreserved bandwidth in the time intervals 532 and 534. As shown, the amounts of unreserved bandwidths in the scheduled time intervals 532 and 534 are reduced to about 10 Gbps and about 30 Gbps, respectively, whereas the amounts of unreserved bandwidths in the unscheduled time intervals 531 and 533 remain at 20 Gbps and 40 Gbps, respectively. The time interval 531 begins at the time 510 and ends at the time 511. The time interval 533 begins at the time 512 and ends at the time 514.

FIG. 5C illustrates an embodiment of a link bandwidth profile 503 after deleting the temporal LSP at a next current time 513, denoted as $T_3$. To track unreserved bandwidth on the link, the profile 502 is updated to the profile 503, where 10 Gbps of bandwidth is released and added to the unreserved bandwidth in the time interval 534 subsequent to the next current time 513. Thus, the profile 503 shows about 40 Gbps of unreserved bandwidth in a time interval 541 that begins at the current time 513 and ends at the time 515.

In an embodiment, when the node detects a significant change in the amount of unreserved bandwidth on the link, the node distributes updated unreserved bandwidth information to other nodes in the network. For example, the node sends an update at the current time 510 to indicate the amount of unreserved bandwidth on the link is updated to about 10 Gbps in the scheduled time interval 532. When each of the other nodes receives the update, each of the other nodes updates a local time-based TEDB according to the received update by generating a profile similar to the profiles 502 for the link.

Figure 6:
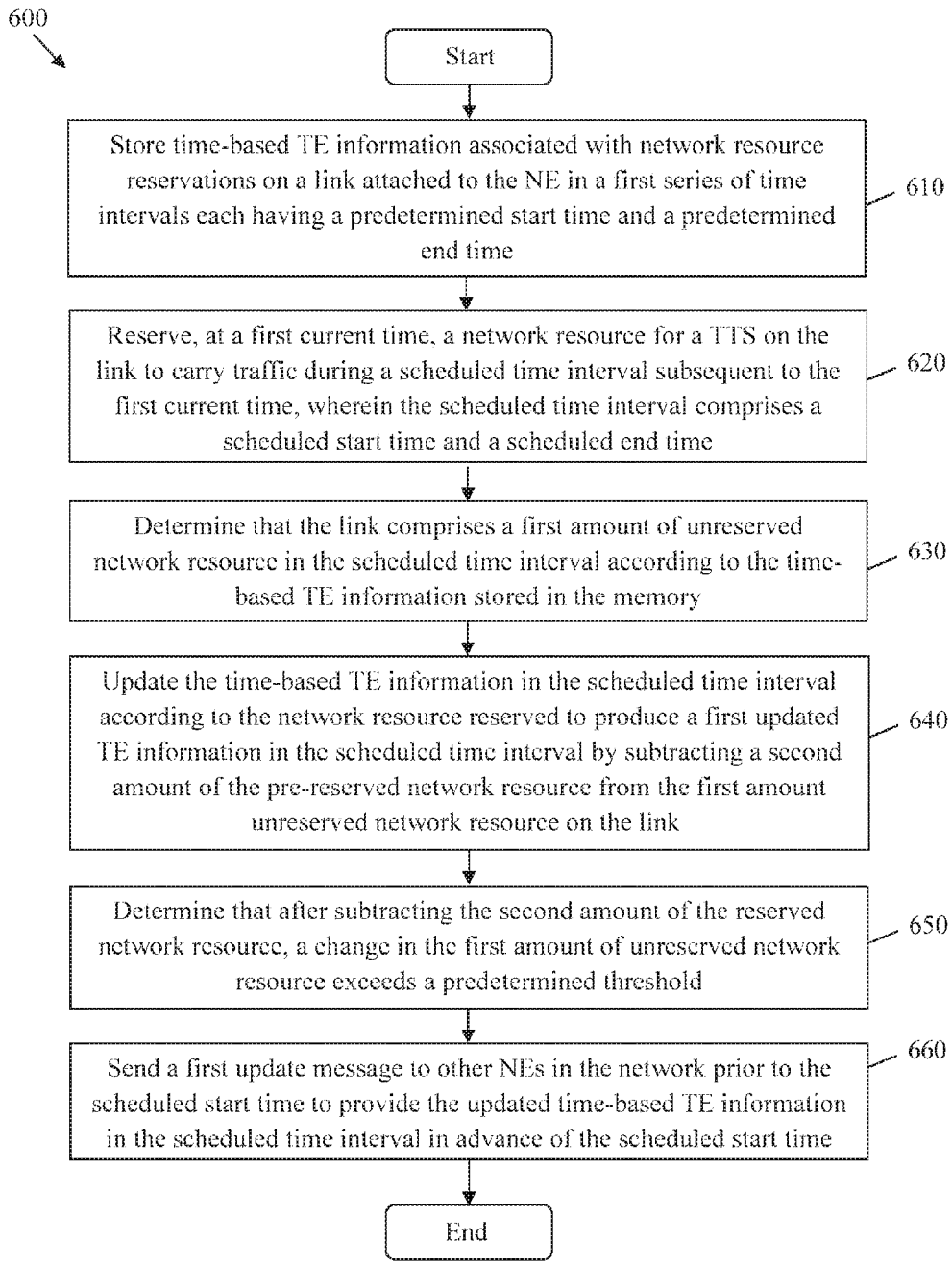
FIG. 6 is a flowchart of an embodiment of a method of managing time-based network resource.

FIG. 6 is a flowchart of an embodiment of a method 600 of managing time-based TE information. The method 600 is implemented by a NE such as the edge nodes 221, the internal nodes 222, and the NE 300. The method 600 employs similar network resource maintenance mechanisms as in the scenario 500. The method 600 is implemented when network resource is reserved on a link such as the links 230-233 attached to the NE for a TTS when a temporal LSP is created in a network such as the network 200 to serve the TTS. At step 610, time-based TE information associated with network resource reservations on a link attached to the NE in a first series of time intervals each having a predetermined start time and a predetermined end time is stored, for example, in memory such as the memory 332. For example, the time-based TE information is similar to the profiles 400, 501, 502, and 503. At step 620, a network resource (e.g., bandwidth) is reserved at a first current time for a TTS on the link to carry traffic during a scheduled time interval subsequent to the first current time, wherein the scheduled time interval comprises a scheduled start time and a scheduled end time. At step 630, a determination is made that the link comprises a first amount of unreserved network resource in the scheduled time interval according to the time-based TE information stored in the memory. At step 640, the time-based TE information is updated in the scheduled time interval to produce a first updated TE information in the scheduled time interval by subtracting a second amount of the reserved network resource from the first amount unreserved network resource on the link. At step 650, a determination is made that after subtracting the second amount of the reserved network resource, a change in the first amount of unreserved network resource exceeds a predetermined threshold. At step 660, a first update message is sent to other NEs in the network prior to the scheduled start time to provide the first updated TE information in the scheduled time interval in advance of the scheduled start time. In an embodiment, the first updated TE information is distributed by employing an extended OSPF TE LSA, as described more fully below.

Figure 7:
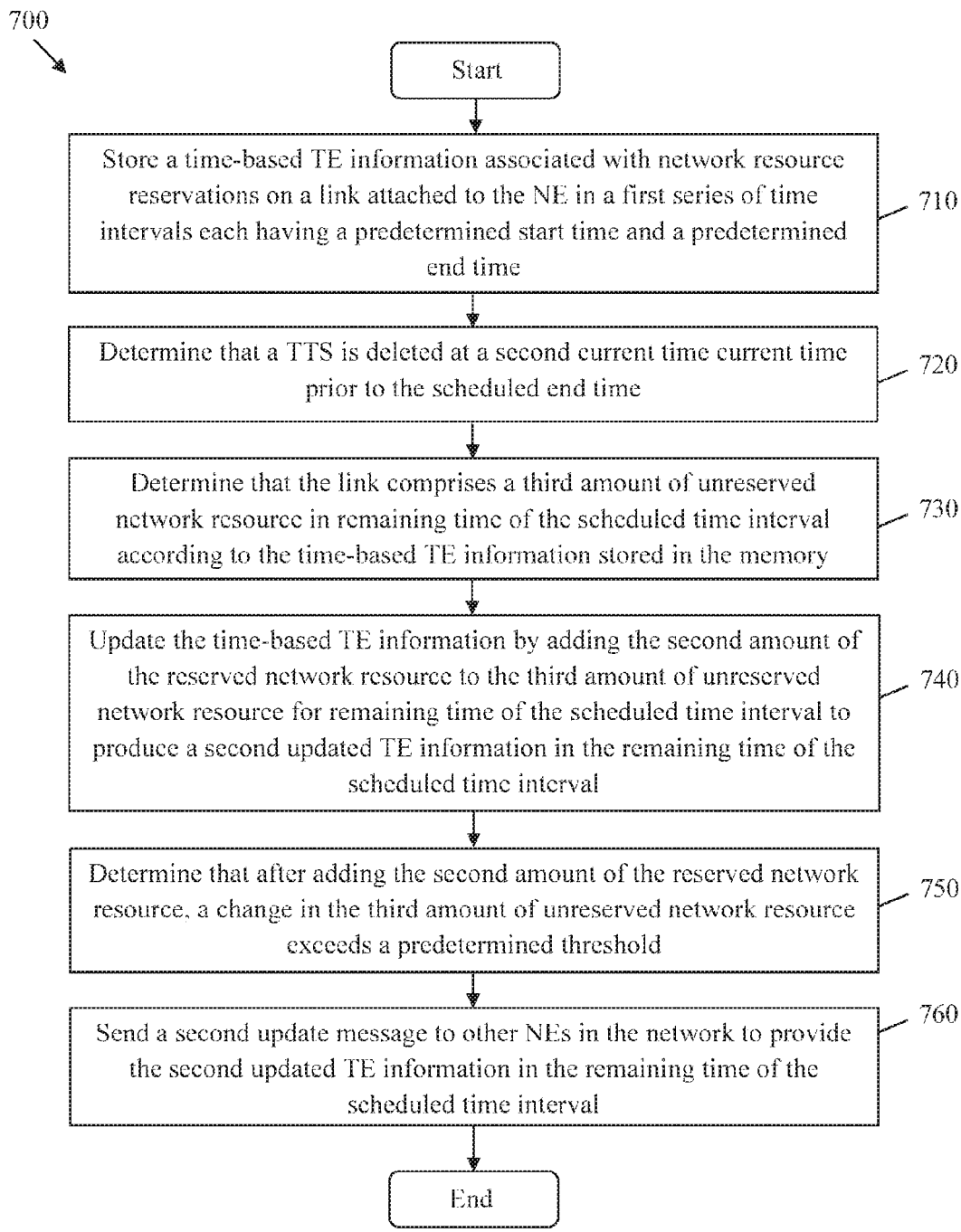
FIG. 7 is a flowchart of another embodiment of a method of managing time-based network resource.

FIG. 7 is a flowchart of another embodiment of a method 700 of managing time-based TE information. The method 700 is implemented by a NE such as the edge nodes 221, the internal nodes 222, and the NE 300. The method 700 employs similar network resource maintenance mechanisms as in the scenario 500. The method 700 is implemented when a temporal USP, such as the temporal LSP 250 serving a TTS, is deleted from a network, such as the network 200. For example, a second amount of network resource is preserved on a link such as the links 230-233 attached to the NE for the TTS in a scheduled time interval having a scheduled start time and a scheduled end time. At step 710, time-based TE information associated with network resource reservations on a link attached to the NE in a first series of time intervals each having a predetermined start time and a predetermined end time is stored, for example, in memory such as the memory 332. For example, the time-based TE information is similar to the profiles 400, 501, 502, and 503. At step 720, a determination is made that the TTS is deleted at a second current time prior to the scheduled end time. At step 730, a determination is made that the link comprises a third amount of unreserved network resource in remaining time of the scheduled time interval according to the time-based TE information stored in the memory. At step 740, the time-based TE information is updated by adding the second amount of the reserved network resource to the third amount of unreserved network resource for remaining time of the scheduled time interval to produce a second updated TE information in the remaining time of the scheduled time interval. At step 750, a determination is made that after adding the second amount of the reserved network resource, a change in the third amount of unreserved network resource exceeds a predetermined threshold. At step 760, a second update message is sent to other NEs in the network to provide the second updated TE information in the remaining time of the scheduled time interval. In an embodiment, the second updated TE information is distributed by employing an extended OSPF TE LSA, as described more fully below.

Figure 8:
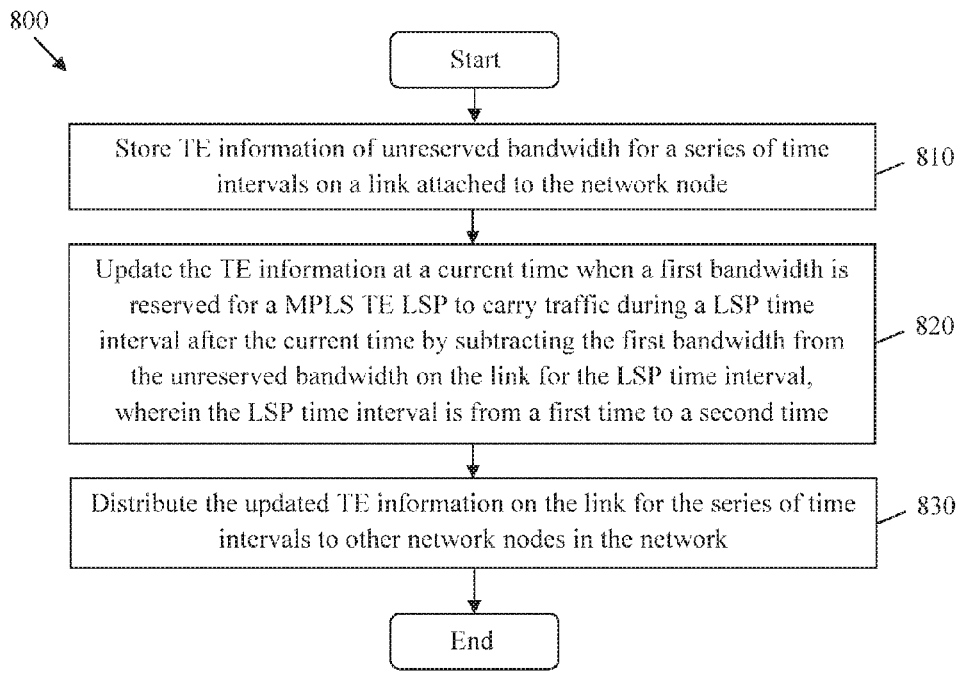
FIG. 8 is a flowchart of another embodiment of a method of managing time-based network resource.

FIG. 8 is a flowchart of another embodiment of a method 800 of managing time-based network resource. The method 800 is implemented by a network node such as the edge nodes 221, the internal nodes 222, and the NE 300. The method 800 is similar to the method 600 and employs similar network resource maintenance mechanisms as in the scenario 500. The method 800 is implemented When time-based TE information is updated in a network such as the network 200. At step 810, TE information of unreserved bandwidth for a series of time intervals on a link such as the link 230-233 attached to the network node is stored, for example, in memory such as the memory 332. The TE information comprises a profile similar to the profiles 400, 501, 502, and 503. At step 820, the TE information is updated at a current time when a first bandwidth is reserved for a MPLS TE LSP similar to the temporal LSP 250 to carry traffic during a LSP time interval after the current time by subtracting the first bandwidth from the unreserved bandwidth on the link for the LSP time interval. The LSP time interval is from a first time to a second time. At step 830, the updated TE information on the link for the series of time intervals is distributed to other network nodes in the network. In an embodiment, the updated TE information is distributed by employing an extended OSPF TE LSA, as described more fully below.

Figure 9:
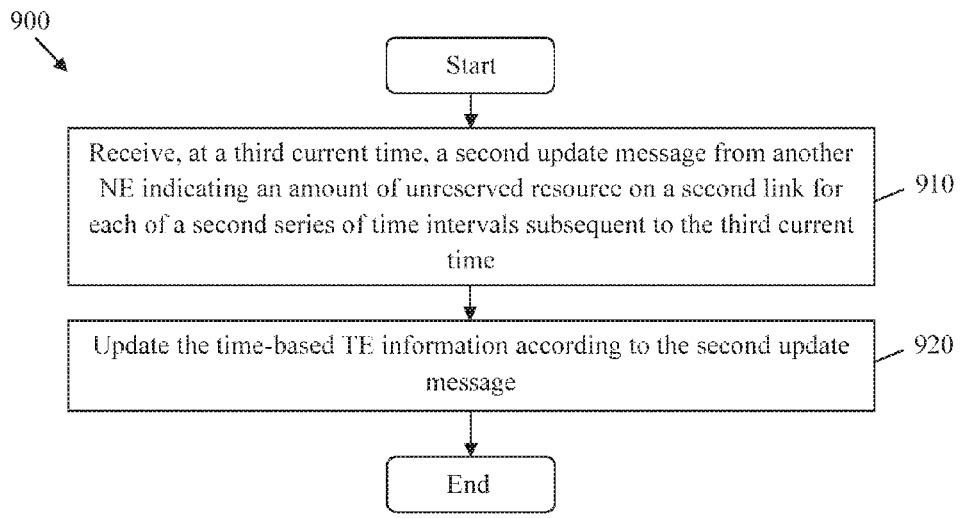
FIG. 9 is a flowchart of another embodiment of a method of managing time-based network resource.

FIG. 9 is a flowchart of another embodiment of a method 900 of managing time-based network resource. The method 900 is implemented by a NE such as the edge nodes 221, the internal nodes 222, and the NE 300. The method 900 employs similar network resource maintenance mechanisms as in the scenario 500. The method 900 is implemented when the NE receives time-based TE information. For example, the NE stores time-based TE information comprising a profile similar to the profiles 400, 501, 502, and 503. At step 910, a second update message is received from another NE in the network at a third current time. The second update message indicates an amount of unreserved resource on a second link for each of a second series of time intervals subsequent to the current time. At step 920, the time-based TE information is updated according to the second updated message. In an embodiment, the second update message is an extended OSPF TE LSA, as described more fully below.

Figure 10:
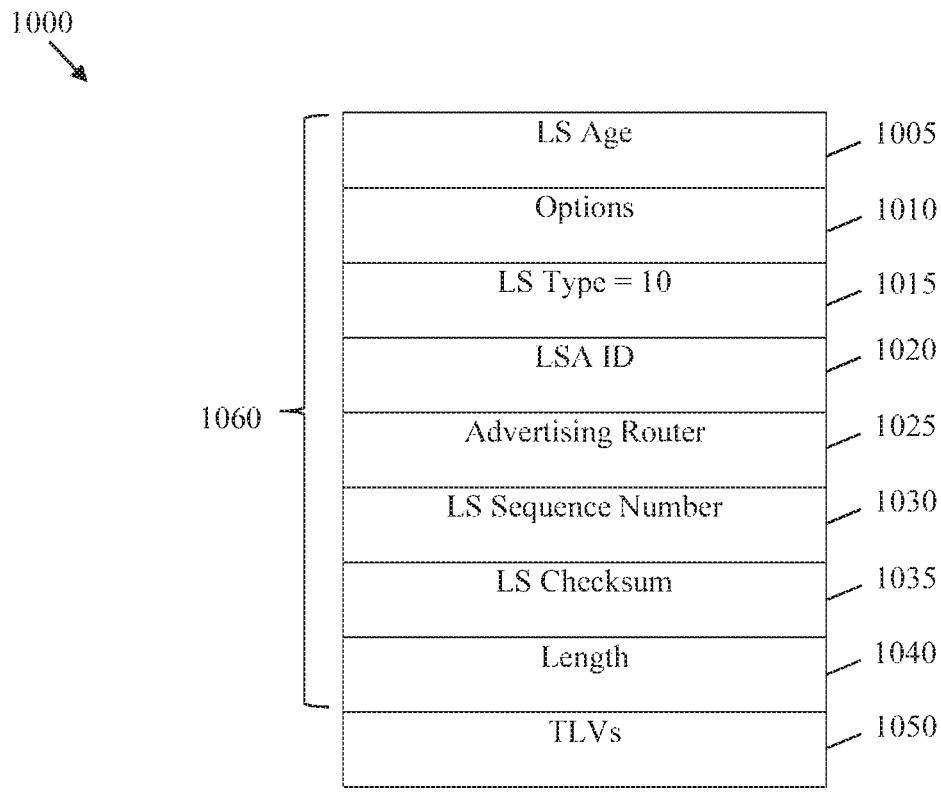
FIG. 10 is a schematic diagram of an embodiment of an extended OSPF opaque LSA for TE.

FIGS. 10-14 illustrate various embodiments of extensions to OSPF TE for distributing time-based TE information as described in the methods 600-900. The extensions are similar to the extensions described in IETF draft document draft-chen-ospf-tts-00.txt titled, "Extensions to OSPF for Temporal LSP," published in Jul. 2, 2015 by H. Chen, et al,, which is incorporated by reference. FIG. 10 is a schematic diagram of an embodiment of an extended OSPF opaque LSA 1000 for TE. The LSA 1000 is similar to the LSA described in document RFC 3630, but is extended to carry time-based TE information comprising profiles similar to the profiles 400, 501, 502, and 503. The LSA 1000 is originated by a network node such as the edge nodes 221, the internal nodes 222, and the NE 300 to distribute time-based TE information of a link such as the links 230-233 attached to the network node. The LSA 1000 comprises a LSA header 1060 and one or more TLVs 1050, The LSA header 1060 comprises a link state (LS) age field 1005, an options field 1010, a LSA type field 1015, a LSA identifier (ID) field 1020, an advertising router field 1025, a LS sequence number field 1030, a LS checksum field 1035, and a length field 1040.

The LS age field 1005 is about two octets long and indicates the time in seconds since the LSA 1000 was originated. The options field 1010 is about one octet long and indicates optional capabilities supported by the described portion of a routing domain. The LSA type field 1015 is about one octet long and indicates the format and function of LSA 1000. For example, the LSA type field 1015 is set to a value of ten to indicate that the 1000 is an area-local opaque LSA. The LSA ID field 1020 is about four octets long and is divided into two sub fields: one octet of type data and three octets of instance ID which is a number used to maintain multiple opaque LSAs. The advertising router field 1025 is about four octets long and indicates a router ID of the originator of the LSA 1000. The LS sequence number field 1030 is about four octets long and is used to detect old or duplicate LSAs. For example, successive instances of a LSA are given successive LS sequence numbers. The LS checksum field 1035 is about two octets long and indicates a Fletcher checksum of the complete contents of the LSA 1000, including the LSA header but excluding the LS age field. The length field 1040 is about two octets long and indicates the length of the LSA 1000, for example, in bytes. The TLVs 1050 may be variable in length. A TLV encoded message may include a type field that may indicate the message type, followed by a length field that may indicate the size of the message value, and a variable-sized series of octets that carry the data for the message. The TLVs 1050 carries time-base TE information, as discussed more fully below.

Figure 11:
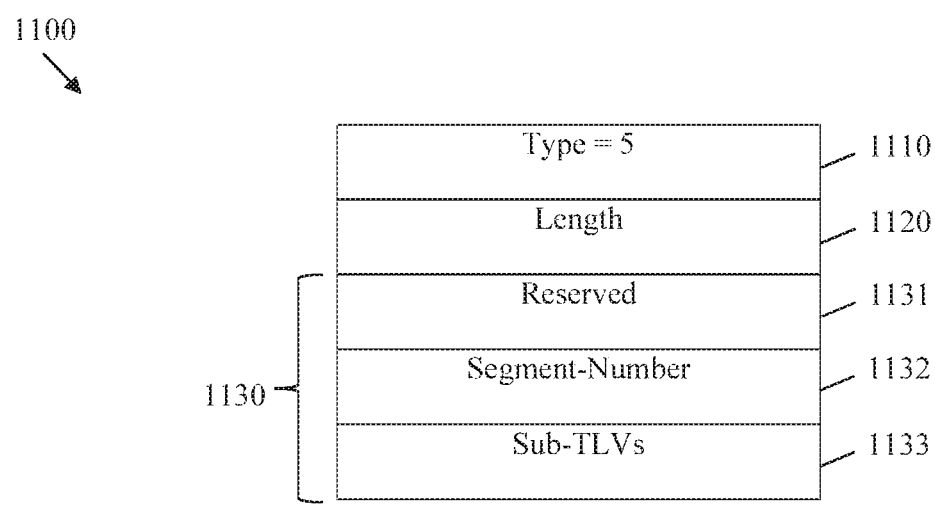
FIG. 11 is a schematic diagram of an embodiment of a TTS link TLV.

FIG. 11 is a schematic diagram of an embodiment of a TTS link TLV 1100. The TLV 1100 is originated by a network node such as the edge nodes 221, the internal nodes 222, and the NE 300 to distribute time-based TE information of a link such as the links 230-233 attached to the network node. The TLV 1110 is carried in an extended OSPF opaque LSA such as the LSA 1000. The TTS link TLV 1100 comprises a type field 1110, a length field 1120, and a value field 1130. The value field 1130 comprises a reserved field 1131, a segment-number field 1132, and a sub-TLV field 1133. The type field 1110 is about two octets long and comprises a value assigned by the Internet assigned number authority (IANA) to indicate that the TLV 1100 is a TTS link TLV. For example, the type field 1110 comprises a value of five. The length field 1120 is about two octets long and indicates a length of the value field 1130, for example, in bytes. The reserved field 1131 is about two octets long and is reserved for further use. The segment-number field 1132 is about two octets long and indicates a segment number. For example, when the time-based TE information about a link is too large to fit into a single TTS link TLV such as the TLV 1100, the time-based TE information is divided into a few portions or segments. Each portion or segment is carried by a TTS link TLV 1100 and identified by a segment number in the segment-number field 1132. The sub TLV field 1133 is variable in length and may comprise a link type sub-TLV, a link ID sub-TLV, a local address sub-TLV, a remote address sub-TLV, a TE metric sub-TLV, a maximum bandwidth TLV, a maximum reservable bandwidth sub-TLV, an unreserved bandwidth sub-TLV, an administrator group sub-TLV, a relative TTS unreserved bandwidth sub-TLV, an absolute TTS unreserved bandwidth sub-TLV, and any other suitable sub-TLVs. The relative TTS unreserved bandwidth sub-TLV and the absolute TTS unreserved bandwidth sub-TLV are described more fully below.

Figure 12:
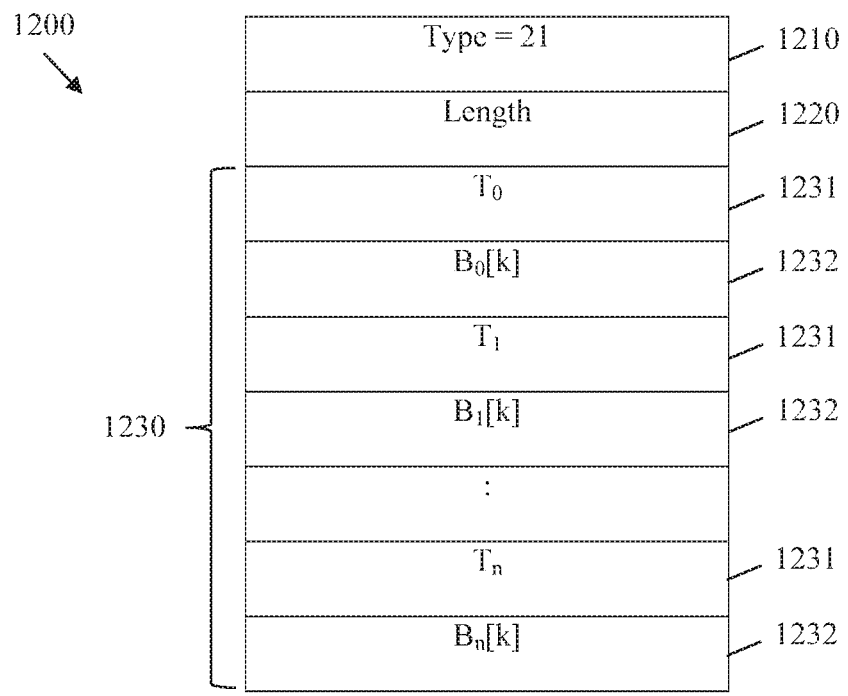
FIG. 12 is a schematic diagram of an embodiment of an absolute TTS unreserved bandwidth sub-TLV.

FIG. 12 is a schematic diagram of an embodiment of an absolute TTS unreserved bandwidth sub-TLV 1200. The sub-TLV 1200 is originated by a network node such as the edge nodes 221, the internal nodes 222, and the NE 300 to distribute time-based TE information of a link such as the links 230-233 attached to the network node. The sub-TLV 1200 is carried in TTS link TLV such as the TLV 1100. The sub-TLV 1200 comprises a type field 1210, a length field 1220, and a value field 1230. The value field 1230 comprises absolute time fields 1231 and unreserved bandwidth fields 1232. The type field 1210 is about two octets long and comprises a value assigned by the IANA to indicate that the sub-TLV 1200 is an absolute TTS unreserved bandwidth sub-TLV. For example, the type field 1210 comprises a value of 21. The length field 1220 is about two octets long and indicates the length of the value field 1230, for example, in bytes. Each absolute time field 1231 is about four octets long. Each unreserved bandwidth field 1232 is about k×4 octets long, where k represents the number of bandwidth priority levels. For example, k is about 8. The absolute time fields 1231 and the unreserved bandwidth fields 1232 are grouped as shown below:

[$T_0$, $B_0[k]$], [$T_1$, $B_1[k]$], . . . , [$T_n$, $B_n[k]$], where $T_j$ represents an absolute time, j varies from 0 to n−1, and $B_j[k]$ represents the amount of unreserved bandwidth at the k number of priority levels for the time period from $T_j$ to $T_{j+1}$. $T_{n+1}$ may be any number representing an infinite time or a maximum number in a computer. Thus, each absolute time field 1231 indicates an absolute start time of a time interval and each unreserved bandwidth field 1232 indicates amounts of unreserved bandwidths at the k number of priority levels during a corresponding time interval. Where each amount of unreserved bandwidth is represented by about four octets, It should be noted that the sub-TLV 1200 may be configured as shown or alternatively configured as determined by a person of ordinary skill in the art to achieve similar functionalities.

Figure 13:
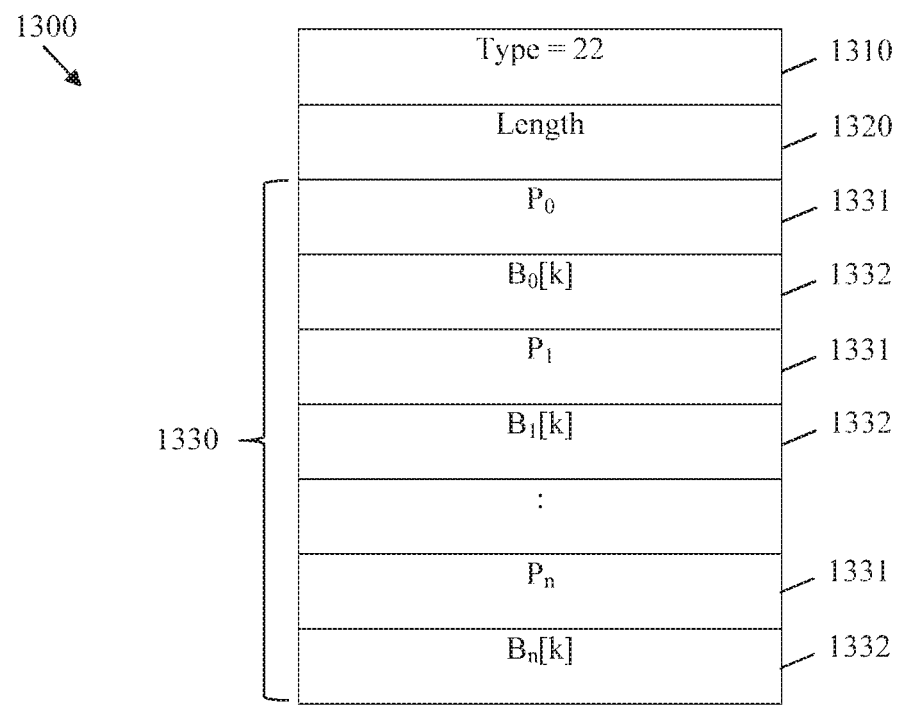
FIG. 13 is a schematic diagram of an embodiment of a relative TTS unreserved bandwidth sub-TLV.

FIG. 13 is a schematic diagram of an embodiment of a relative TTS unreserved bandwidth sub-TLV 1300. The sub-TLV 1300 is originated by a network node such as the edge nodes 221, the internal nodes 222, and the NE 300 to distribute time-based TE information of a link such as the links 230-233 attached to the network node. The sub-TLV 1300 is carried in TTS link TLV such as the TLV 1100. The sub-TLV 1330 comprises a type field 1310, a length field 1320, and a value field 1330. The value field 1330 comprises relative time fields 1331 and unreserved bandwidth fields 1332. The type field 1310 is about two octets long and comprises a value assigned by the IANA to indicate that the sub-TLV 1330 is a relative TTS unreserved bandwidth sub-TLV. For example, the type field 1310 comprises a value of 22. The length field 1320 is about two octets long and indicates the length of the value field 1330, for example, in bytes. Each relative time field 1331 is about four octets long. Each unreserved bandwidth field 1332 is about k×4 octets long, where k represents the number of bandwidth priority levels. For example, k is about 8. The relative time fields 1331 and the unreserved bandwidth fields 1332 are grouped as shown below:

[$P_0$, $B_0[k]$], [$P_1$, $B_1[k]$], . . . , [$P_n$, $B_n[k]$], where $P_j$ represents a time period, j varies from 0 to n−1, and $B_j[k]$ represents the amount of unreserved bandwidth at the k number of priority levels for the time period $P_j$. Thus, each relative time field 1331 indicates a time period, for example, in seconds, and each unreserved bandwidth field 1332 indicates amounts of unreserved bandwidth at the k number of priority levels during a corresponding time period, where each amount of unreserved bandwidth is represented by about four octets. It should be noted that the sub-TLV 1300 may be configured as shown or alternatively configured as determined by a person of ordinary skill in the art to achieve similar functionalities.

Figure 14:
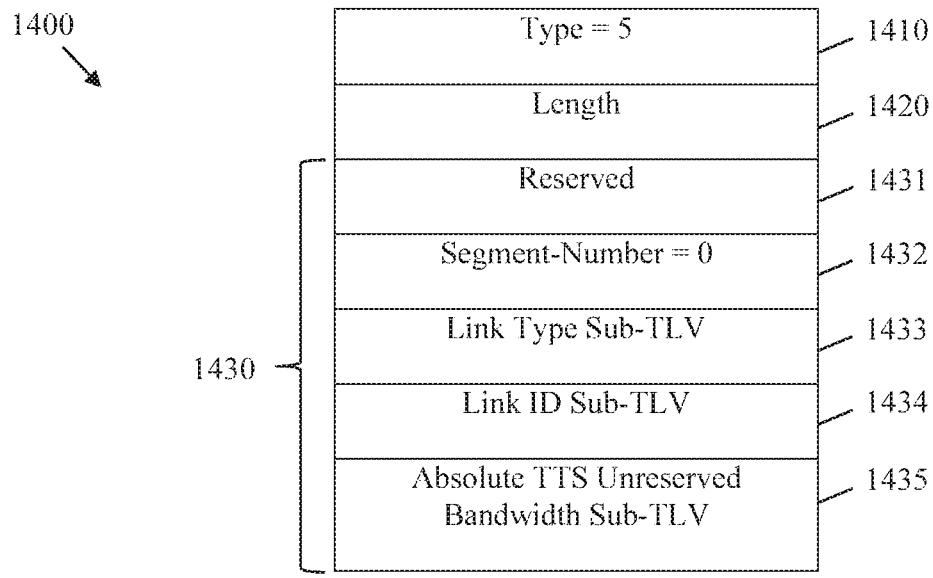
FIG. 14 is a schematic diagram of another embodiment of a TTS link TLV.

FIG. 14 is a schematic diagram of another embodiment of a TTS link TLV 1400. The TLV 1400 is originated by a network node such as the edge nodes 221, the internal nodes 222, and the NE 300 to distribute time-based TE information of a link such as the links 230-233 attached to the network node. The TLV 1400 is carried in an extended OSPF opaque LSA such as the LSA 1000. The TLV 1400 is similar to the TLV 1100 and illustrates a more detailed view of the content of the TLV 1100. The TLV 1400 comprises a type field 1410 similar to the type field 1110, a length field 1420 similar to the length field 1120, and a value field 1430 similar to the value field 1130. The value field 1430 comprises a reserved field 1431 similar to the reserved field 1131, a segment-number field 1432 similar to the segment-number field 1132, a link type sub-TLV 1433, a link ID sub-TLV 1434, and an absolute TTS unreserved bandwidth sub-TLV 1435 similar to the sub-TLV 1200. For example, the segment-number field 1432 is set to a value of 0 to identify a segment of the TLV 1400. The link type sub-TLV 1433 defines the type of the link and the link ID sub-TLV 1434 identifies the link. The TLV 1400 may comprise other sub-TLVs such as a local address sub-TLV, a remote address sub-TLV, a TE metric sub-TLV, a maximum bandwidth sub-TLV, and a maximum reservable bandwidth sub-TLV as described in the document RFC 3630. In an embodiment, backward compatibility is maintained by including TE information in a first time interval using link TLVs as described in the document RFC 3630 and including TE information in subsequent time intervals by using the absolute TTS unreserved bandwidth sub-TLV 1435.

Figure 15:
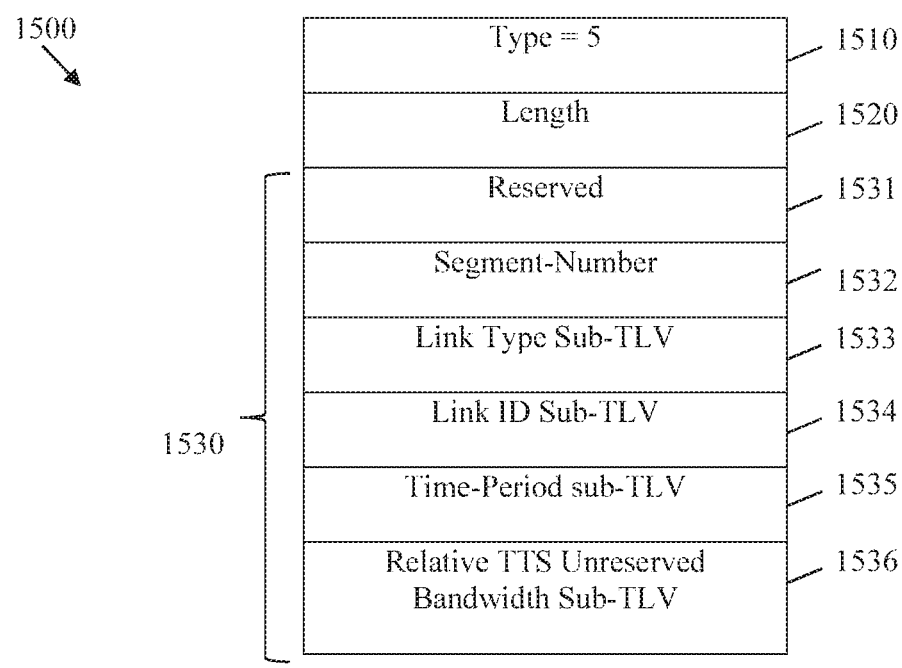
FIG. 15 is a schematic diagram of another embodiment of a TTS TLV.

FIG. 15 is a schematic diagram of another embodiment of a TTS link TLV 1500. The TLV 1500 is originated by a network node such as the edge nodes 221, the internal nodes 222, and the NE 300 to distribute time-based TE information of a link such as the links 230-233 attached to the network node. The TLV 1500 is carried in an extended OSPF opaque LSA such as the LSA 1000. The TLV 1500 is similar to the TLV 1400, but indicates time-based information using relative time. The TLV 1500 comprises a type field 1510 similar to the type fields 1110 and 1410, a length field 1520 similar to the length fields 1120 and 1420, and a value field 1530 similar to the value fields 1130 and 1430. The value field 1530 comprises a reserved field 1531 similar to the reserved fields 1131 and 1431, a segment-number field 1532 similar to the segment-number fields 1132 and 1432, a link type sub-TLV 1533 similar to the link type sub-TLV 1433, a link ID sub-TLV 1534 similar to the link ID sub-TLV 1434, a time-period TLV 1535, and a relative TTS unreserved bandwidth sub-TLV 1536 similar to the sub-TLV 1300. The TLV 1500 provides backward compatibility by including TE information in a first time interval using link TLVs as described in the document RFC 3630. The TLV 1500 uses the time-period sub-TLV 1535 to indicate a duration of the first time interval, as described more fully below, and includes TE information in subsequent time intervals by using the sub-TLV 1536. In another embodiment, the TLV 1500 may not include any Time-Period sub-TLV 1535. The YE information in all time intervals for a link is included in a relative TTS unreserved bandwidth sub-TLV 1536 similar to the sub-TLV 1300.

Figure 16:
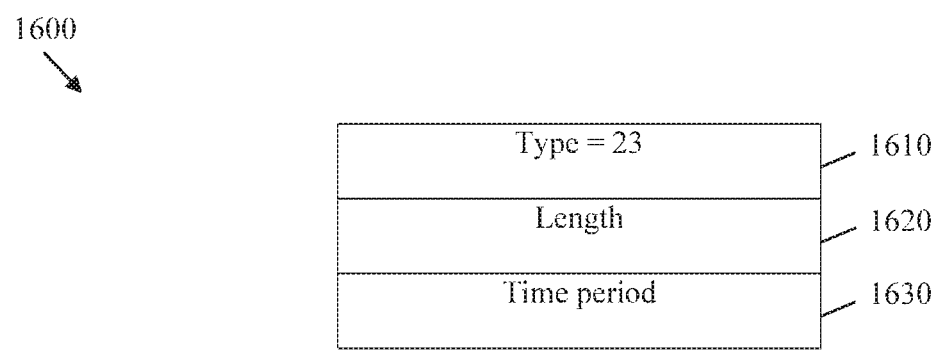
FIG. 16 is schematic diagram of an embodiment of a time-period length sub-TLV.

FIG. 16 is schematic diagram of an embodiment of a time-period length sub-TLV 1600. The sub-TLV 1600 is originated by a network node such as the edge nodes 221, the internal nodes 222, and the NE 300 to distribute timing information associated with time-based TE information of a link such as the links 230-233 attached to the network node. The sub-TLV 1600 is carried in a TTS TLV such as the TLVs 1100 and 1500. The sub-TLV 1600 comprises a type field 1610, a length field 1620, and a time period length field 1630. The type field 1610 is about two octets long and comprises a value assigned by the LANA to indicate that the sub-TLV 1600 is a time period length sub-TLV. For example, the type field 1610 comprises a value of 23. The length field 1620 is about two octets long and indicates the length of the time period field 1630, for example, in bytes. The time period length field 1630 is about 4 octets long and indicates the length of a time period, for example, in seconds.

In an embodiment, a network node such as the edge nodes 221, the internal nodes 222, and the NE 300 may construct a LSA such as the LSA 1000 with an instance ID for distributing time-based TE information of a link such as the links 230-233 attached to the network node. The time-based TE information may comprise a profile similar to the profiles 400, 501, 502, and 503. The LSA may comprise a TLV in a field similar to the TLV field 1050. The TLV may comprise a link type sub-TLV indicating a link type of the link, a link ID sub-TLV that identifies the link, a TTS sub-TLV similar to the sub-TLV 1200 or 1300 that describe the time-based TE information, and any other suitable sub-TLV. The TTS sub-TLV may indicate unreserved bandwidths at one or more priority levels in a number of time intervals. The network node may increment a segment number in a segment-number field such as the segment-number field 1132, 1432, and 1532 of successive TTS sub-TLV to be included in another LSA such as the LSA 1000 with another instance ID.

As described above, once an existing MPLS TE LSP is set up, it is assumed to carry traffic forever until it is down. When an MPLS TE LSP tunnel is up, it is assumed that the LSP consumes its reserved network resources forever even though the LSP may only use network resources during some period of time. As a result, the network resources are not used efficiently, Moreover, a tunnel service may not be reserved or book d in advance for a period of time. The disclosed embodiments specify extensions to OSPF for supporting the setup of an MPLS TE LSP in a period of time called a time interval or a sequence of time intervals. It is assumed that the LSP carries traffic during this time interval or each of these time intervals. Thus, the network resources are efficiently used. More importantly, some new services may be provided. For example, a consumer may book a tunnel service in advance for a time interval or a sequence of time intervals. Tunnel services may be scheduled.

The existing OSPF TE distributes an unreserved bandwidth Bi at each of eight priority levels for a link at one point of time, for example, at the current time. This means that the link has bandwidth Bi at a priority level from now to forever until there is a change to it. This TE information on the link is stored in TEDB. Thus, a temporal LSP (e.g., a LSP in a time interval) may not be set up using the information in the TEDB and the bandwidth may not be reserved in advance for the LSP in the time interval. To support temporal LSPs, the OSPF should be extended to distribute TE information on a link in a series of time intervals.

In an embodiment of TE information in absolute time, suppose that the amount of the unreserved bandwidth at a priority level on a link is Bj in a time interval from time Tj to Tk (k=j+1), where j=0, 1, 2, .... The unreserved bandwidth on the link may be represented as:

[T0, B0], [T1, B1], [T2, B2], [T3, B3], ...

The time Tj (j=0, 1, 2, ...) is a synchronized time among all network nodes. If a LSP is deleted or down at time T and uses bandwidth B, then for every time interval/period (after time T) during which bandwidth B is reserved for the LSP on a link attached to a network node, the network node adds B to the link for that interval/period. If a LSP is set up at time T and uses bandwidth B, then for every time interval/period (after time T) during which bandwidth B is reserved for the LSP on a link attached to a network node, the network node subtracts bandwidth B from the link for that interval/period. If there are significant changes to the bandwidths on a link attached to a network node, the network node distributes the bandwidths on the link to other network nodes. That is, an updated [T0, B0], [T1, B1], [T2, B2], [T3, B3], etc., is distributed to other network nodes in the network. Each of the other network nodes may construct or determine the bandwidth for a series of time intervals/periods on a link after receiving the information.

Alternatively, a relative time representation of bandwidths on a link may be used. For example, the amount of the unreserved bandwidth at a priority level on a link is Bj during a series of time intervals/periods may be expressed as:

[P0, B0], [P1, B1], [P2, B2], [P3, B3], ...,
where Pj=Tk−Tj, k=(j+1) and j=0, 1, 2, 3, ....

In this representation, every time Tj (j=0, 1, 2, ...) may be a local time. A timer may expire after every unit of time (e.g., every second) and trigger—P0, which decrements P0. When P0=0, P1 becomes P0, P2 becomes P1, and so on. If there are significant changes to the bandwidths on a link attached to a node, the node distributes the bandwidths on the link to other nodes. That is, an updated [P0, B0], [P1, B1], [P2, B2], [P3, B3], ..., is distributed to other network nodes in the network. On each of the other network nodes, a timer may expire for every unit of time (e.g., every second) and trigger—P0, which decrements P0. When P0=0, P1 becomes P0, P2 becomes P1, and so on. An advantage of using relative time representation is that the times or clocks on all the network nodes may be different.

In an embodiment of extensions to OSPF for supporting the setup of temporal LSPs, an opaque LSA (e.g., the LSA 1000) of type 10 is originated by a network node to distribute TE information such as the bandwidth of a link that is attached to the network node. The opaque LSA comprises a (LS) age field, an options field, an LS type field, a LSA ID field, an advertising router field, an LS sequence number field, an LS checksum field, a length field, and one or more TLVs. The LS age field indicates the time since the LSA was originated in seconds. The options field indicates the optional capabilities supported by the described portion of the routing domain. The LS type field indicates the type of the LSA. The LSA ID field comprises a type data field and an instance ID field which is a number used to maintain multiple opaque LSAs. The advertising router field indicates the Router ID of the router that originated the LSA. The LS sequence number field is used to detect old or duplicate LSAs. Successive instances of a LSA are given successive LS sequence numbers. The LS checksum field indicates the Fletcher checksum of the complete contents of the LSA, including the LSA header but excluding the LS age field. The length field indicates the length of the LSA in bytes.

In addition to existing router address TLV and link TLV, TLVs fields may comprise a new TTS link TLV (e.g., the TLV 1100). The TTS link TLV comprises a type field, a length field, a reserved field, a segment-number field, and a sub TLVs field. The type field may comprise a value assigned by the LANA to indicate that the TLV is a TTS link TLV. For example, the type field may comprise a value of 5. The length field may indicate the length of the values in the TTS link TLV in bytes. The segment-number indicates a segment of the TTS link TLV. The information on a link may be too big to fit into one TTS link TLV. In this case, the information may be split into a few of segments, each of which is put into a TTS link TLV and identified by a segment number. The sub TLV field comprises a link type sub-TLV and a link ID sub-TLV. It may further comprise a local address sub-TLV, a remote address sub-TLV, a TE metric sub-TLV, a maximum bandwidth sub-TLV, a maximum reservable bandwidth sub-TLV, an unreserved bandwidth sub-TLV, an administrator group sub-TLV, a relative TTS unreserved bandwidth sub-TLV, an absolute TTS unreserved bandwidth sub-TLV, and any other suitable sub-TLVs.

The format of an absolute TTS unreserved bandwidth sub-TLV (e.g., the sub-TLV 1200) comprises a type field, a length field, absolute time fields, and unreserved bandwidth fields. The type field may comprise a value assigned by the IANA to indicate that the sub-TLV is an absolute TTS unreserved bandwidth sub-TLV. For example, the type field may comprise a value of 21. The length field may indicate the length of the values in the absolute TTS unreserved bandwidth sub-TLV in bytes. The absolute time fields and the unreserved bandwidth fields may be in pairs such as:

[T0, B0[8]], [T1, B1[8]], ..., [Tn, Bn[8]],
where T0, T1, ..., Tn are the times synchronized among all the nodes and Bj[8] (j=0, 1, ..., n) are the amount of unreserved bandwidth at eight priority levels in the time interval/period from Tj to Tk (k=j+1).

The format of a relative TTS unreserved bandwidth sub-TLV (e.g., the sub-TLV 1300) comprises a type field, a length field, relative time fields, and unreserved bandwidth fields. The type field may comprise a value assigned by the IANA to indicate that the sub-TLV is a relative TTS unreserved bandwidth sub-TLV. For example, the type field may comprise a value of 22. The length field may indicate the length of the values in the relative TTS unreserved bandwidth sub-TLV in bytes. The relative time fields and the unreserved bandwidth fields may be in pairs such as:

[P0, B0[8]], [P1, B1[8]], ..., [Pn, Bn[8]],
where Pj (j=0, 1, ..., n) is the time period during which the unreserved bandwidth is Bj[8], containing the amount of unreserved bandwidth at eight priority levels.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A network element (NE) in a network, comprising:
a memory configured to store time-based traffic engineering (TE) information associated with network resource reservations on a link attached to the NE in a series of time intervals each having a predetermined start time and a predetermined end time;
a processor coupled to the memory and configured to:
reserve, at a first current time, a network resource for a temporal tunnel service (TTS) on the link to carry traffic during a scheduled time interval subsequent to the first current time, wherein the scheduled time interval comprises a scheduled start time and a scheduled end time; and
update, at the first current time, the time-based TE information in the scheduled time interval according to the network resource reserved to produce a first updated TE information in the scheduled time interval; and
a transmitter coupled to the processor and configured to send a first update message to other NEs in the network prior to the scheduled start time to provide the first updated TE information in the scheduled time interval in advance of the scheduled start time.

2. The NE of claim 1, wherein the processor is further configured to:
determine that the link comprises a first amount of unreserved network resource in the scheduled time interval according to the time-based TE information stored in the memory; and
update the time-based TE information by subtracting a second amount of the reserved network resource from the first amount of unreserved network resource.

3. The NE of claim 2, wherein the processor is further configured to determine that after subtracting the second amount of the reserved network resource, a change in the first amount of unreserved network resource exceeds a predetermined threshold, and wherein the first update message is sent when determining that the change exceeds the predetermined threshold.

4. The NE of claim 2, wherein the network resource reservation is associated with bandwidth reservation at one or more priority levels, and wherein the first amount of unreserved network resource and the second amount of the reserved network resource are of bandwidths at a same priority level.

5. The NE of claim 2, wherein the processor is further configured to:
determine that the TTS is deleted at a second current time prior to the scheduled end time;
determine, at the second current time, that the link comprises a third amount of unreserved network resource in a remaining time of the scheduled time interval according to the time-based TE information stored in the memory; and
update the time-based TE information by adding the second amount of the reserved network resource to the third amount of unreserved network resource for the remaining time of the scheduled time interval to produce a second updated TE information in the remaining time of the scheduled time interval.

6. The NE of claim 5, wherein the processor is further configured to determine that after adding the second amount of the reserved network resource, a change in the third amount of unreserved network resource exceeds a predetermined threshold, and wherein the transmitter is further configured to send a second update message to other NEs in the network to provide the second updated TE information in the remaining time of the scheduled time interval.

7. The NE of claim 1, wherein the series of time intervals are consecutive in time, wherein the time-based TE information indicates:
an amount of unreserved network resource for each of the series of time intervals; and
an absolute time for each predetermined start time of each of the series of time intervals, and
wherein the absolute time is a global clock time that is synchronized among all NEs in the network.

8. The NE of claim 1, wherein the series of time intervals are consecutive in time, and wherein the time-based TE information indicates:
an amount of unreserved network resource for each of the series of time intervals; and
a duration for each of the series of time intervals.

9. The NE of claim 1, wherein the network is a multi-protocol label switching (MPLS) network, where the TTS is carried by a label switched path (LSP) tunnel in the network, wherein the NE is positioned along a forwarding path of the LSP, and wherein the first update message is an open shortest path first (OSPF) traffic engineering (TE) link state advertisement (LSA).

10. A method implemented by a network element (NE) in a network, the method comprising:
storing, in a memory of the NE, tune-based traffic engineering (TE) information associated with network resource reservations on a link attached to the NE in a first series of time intervals each having a predetermined start time and a predetermined end time;
reserving, via a processor of the NE, at a first current time, a network resource for a temporal tunnel service (TTS) on the link to carry traffic during a scheduled time interval subsequent to the first current time, wherein the scheduled time interval comprises a scheduled start time and a scheduled end time;
updating, via the processor, the time-based TE information in the scheduled time interval according to the reserved network resource to produce a first updated TE information in the schedule time interval; and
sending, via a transmitter of the NE, a first update message to other NEs in the network prior to the scheduled start time to provide the first updated TE information in the scheduled time interval in advance of the scheduled start time.

11. The method claim 10, further comprising determining, via the processor, that the link comprises a first amount of unreserved network resource in the scheduled time interval according to the time-based TE information stored in the memory, and wherein updating the time-based TE information in the scheduled time interval comprises subtracting a second amount of the reserved network resource from the first amount of unreserved network resource.

12. The method of claim 11, further comprising determining, via the processor, that after subtracting the second amount of the reserved network resource, a change in the first amount of unreserved network resource exceeds a predetermined threshold, wherein the first update message is sent when determining that the change exceeds the predetermined threshold.

13. The method of claim 11, further comprising:
determining, via the processor, that the TTS is deleted at a second current time prior to the scheduled end time;

determining, at the second current time, that the link comprises a third amount of unreserved network resource in remaining time of the scheduled time interval according to the time-based TE information stored in the memory; and updating the time-based TE information by adding the second amount of the reserved network resource to the third amount of unreserved network resource for the remaining time of the scheduled time interval.

14. The method of claim 10, further comprising:

receiving, via a receiver of the NE at a third current time, a second update message from another NE indicating an amount of unreserved resource on a second link for each of a second series of time intervals subsequent to the third current time; and updating, via the processor, the time-based information according to the amount of unreserved resource on the second link each of the second series of time intervals indicated in the second update message.

15. The method of claim 14, wherein the second update message indicates timing information of the second series of time intervals by absolute time, relative time, or combinations thereof.

16. A method comprising:

storing, by a network node of the network, traffic engineering (TE) information of unreserved bandwidth for a series of time intervals on a link attached to the network node;

updating, by the network node, the TE information at a current time when a first bandwidth is reserved for a multiprotocol label switching (MPLS) TE labeled switched path (LSP) to carry traffic during a LSP time interval after the current time by subtracting the first bandwidth from the unreserved bandwidth on the link for the LSP time interval, wherein the LSP time interval is from a first time to a second time; and distributing, by the network node to other nodes in the network, the updated TE information on the link for the series of time intervals.

17. The method of claim 16, wherein distributing the updated TE information comprises distributing an open shortest path first (OSPF) traffic engineering (TE) link state advertisement (LSA) comprising a type-length-value (TLV) comprising:

a first type field indicating that the TLV is a temporal tunnel service (TTS) link TLV; and a sub-TLV indicating the updated TE information for the series of time intervals.

18. The method of claim 17, wherein the sub-TLV comprises:

a second type field indicating that the sub-TLV is an absolute TTS unreserved bandwidth sub-TLV;

one or more unreserved bandwidth fields each indicating an amount of unreserved bandwidth at a certain priority level on the link in a first time interval, denoted as j, of the series of time intervals from a first absolute time, denoted as $T_j$, to a second absolute time, denoted as $T_k$; and an absolute time field indicating the first absolute time, wherein the first absolute time is synchronized among all network nodes in the network, and wherein j+k+1.

19. The method of claim 17, wherein the sub-TLV comprises:

a third type field indicating that the sub-TLV is a relative TTS unreserved bandwidth sub-TLV;

one or more unreserved bandwidth fields each indicating an amount of unreserved bandwidth at a certain priority level on the link in a first time interval of the series of time intervals; and a relative time field indicating a period of the first time interval.

20. The method of claim 16, wherein distributing the updated TE information comprises distributing an open shortest path first (OSPF) traffic engineering (TE) link state advertisement (LSA) comprising a type-length-value (TLV) comprising:

a first type field indicating that the TLV is a temporal tunnel service (TTS) link TLV;

a sub-TLV indicating a segment of the updated TE information for the series of time intervals; and a segment-number field indicating a segment number that identifies the segment of the TE information.

* * * * *